Aug. 31, 1948.  F. W. BLANCHARD  2,448,294
BREAKABLE BUILDING FORM

Original Filed May 26, 1941  2 Sheets-Sheet 1

INVENTOR.
Francis W. Blanchard,
By Parker, Prochnow & Farmer,
ATTORNEYS.

Aug. 31, 1948.   F. W. BLANCHARD   2,448,294
BREAKABLE BUILDING FORM
Original Filed May 26, 1941   2 Sheets-Sheet 2
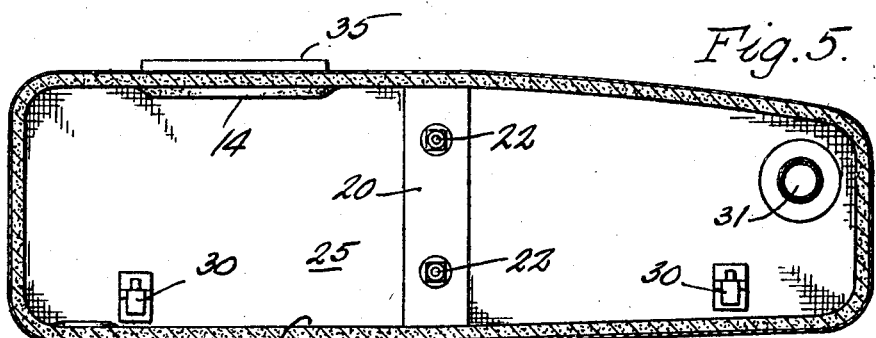
Fig. 5.
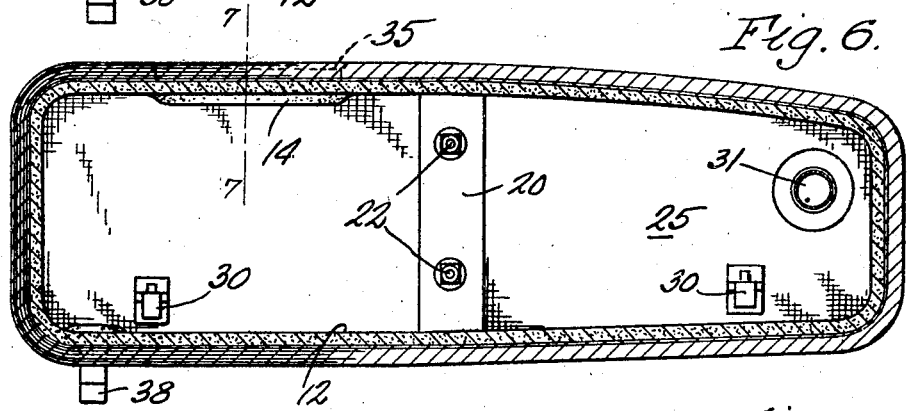
Fig. 6.
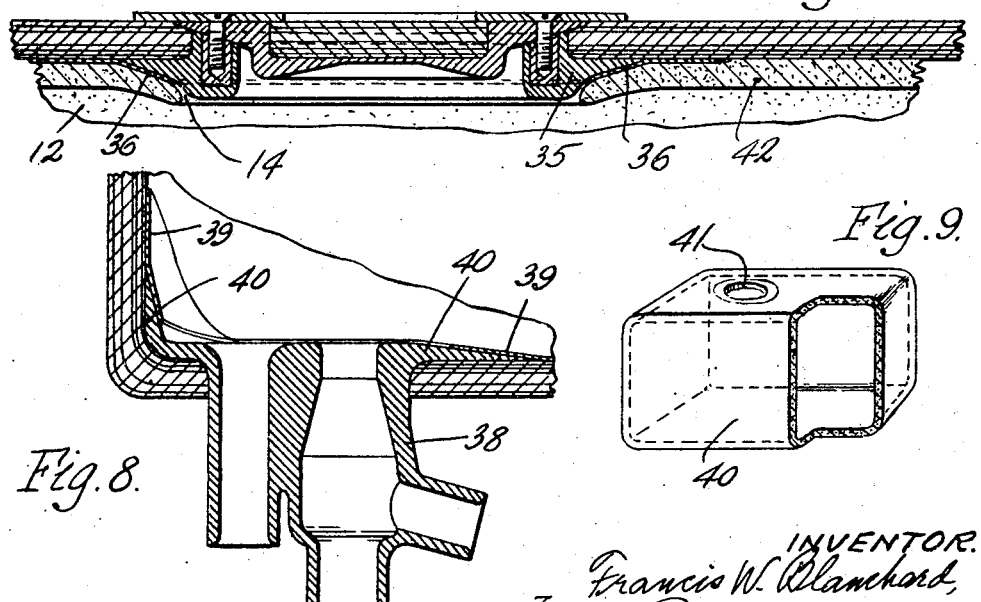
Fig. 7.
Fig. 8.   Fig. 9.
INVENTOR.
Francis W. Blanchard,
By Parker, Crochnow Farmer,
ATTORNEYS.

Patented Aug. 31, 1948

2,448,294

UNITED STATES PATENT OFFICE 2,448,294

BREAKABLE BUILDING FORM

Francis W. Blanchard, Snyder, N. Y., assignor to Hewitt Rubber Corporation, Buffalo, N. Y.

Original application May 26, 1941, Serial No. 395,160. Divided and this application July 19, 1945, Serial No. 605,905

5 Claims. (Cl. 18—45)

This invention relates to breakable building forms for use in connection with the building of tanks or containers for gasoline, oil or other liquids, and which are formed of a number of layers of flexible materials. Tanks of this type are, for example, employed as fuel and oil tanks for airplanes and may be of the type which when punctured by a bullet or other means seal the hole made in the wall of the tank.

This is a division of copending application for patent Ser. No. 395,160, filed May 26, 1941, now Patent No. 2,426,384.

Tanks of this type of large size have heretofore been built about sectional metal forms, the sections of which are removably secured together so that these sections can, after the construction of the tank is completed, be taken apart within the tank and removed through openings in the tank. This method of building tanks is, however, not practical or desirable for use in connection with smaller tanks.

One of the objects of this invention is to provide forms of improved construction for use in building such tanks, and which are readily breakable after the building of the tank is completed so that the fragments of the forms can be removed through openings in the tanks.

Containers of this type are generally provided in the walls thereof with a plurality of fittings through which access may be had to the interior of the tank, such fittings being in the forms of annular seats or bushings for hand holes and gages, flanged tubular parts for connection with inlet, discharge, vent or drainage ducts, and the like. In many of the tanks or containers some or all of these fittings must be accurately located in order to permit installation of the tank on a plane or vehicle.

Another object of this invention is to provide forms of this type with suitable openings therein in registration with the openings to be formed in the tank. A further object of this invention is to provide forms of this type having openings which are located so that they may be used for the locating of bushings and other fittings of the tank.

Another object of this invention is to provide breakable building forms for use in the construction of tanks, which forms are so made as to position accurately any baffles which may be built into the tanks. It is also an object of this invention to provide breakable building forms constructed in sections so that a baffle to be secured in the tank may be positioned between and secured in place by said sections.

Other objects of this invention will appear from the following description and claims.

In the accompanying drawings:

Fig. 5 is a transverse sectional elevation, on line 5—5, Fig. 2, of a breakable form embodying this invention, and showing a layer of the tank applied to the form.

Fig. 6 is a similar view showing a complete tank constructed about the breakable form.

Fig. 7 is a fragmentary sectional view thereof, on an enlarged scale, on line 7—7, Fig. 6, and showing the manner of securing a fitting, such as a hand hole, in place on the tank.

Fig. 8 is a fragmentary sectional view of the tank after the removal of the building form and showing another type of fitting of the tank.

Fig. 9 is a perspective view, on a reduced scale, of a breakable form of unitary or single-piece construction, showing a portion thereof broken away.

Figure 1:
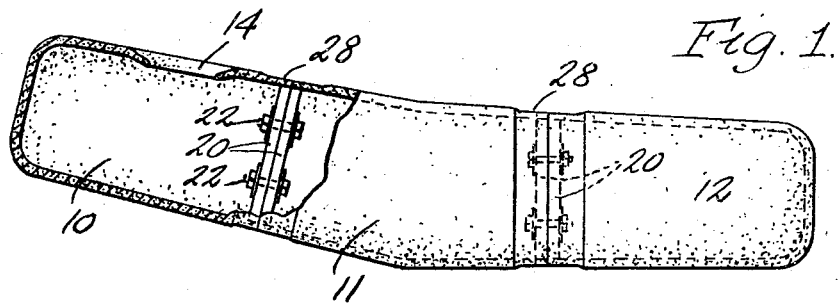
Fig. 1 is an elevation, partly in section, of a breakable form embodying this invention, the form shown being in sections bolted together.

In the building of the tanks of flexible material capable of sealing holes made by penetration through the walls of the tanks by bullets or the like, some rigid forms must be employed to maintain the flexible layers of which the tank walls are formed in approximately correct positions, and I have found that the construction of tanks or containers of this type is greatly facilitated by the use of building forms made of breakable material of such a nature that when broken, the material of the breakable forms can be removed through hand holes or similar openings in the tanks without cutting or damaging the same. These breakable building forms may be made of a single material or of a plurality of materials and may be built of one or more layers or plies. For example, these breakable forms may be made of various materials including paper, paper pulp, gypsum, Portland cement, resinous plastic materials, or of combinations of these materials. The breakable forms must have sufficient strength to be able to withstand the uses to which the forms are put during the building of the tanks, for example, such pressures as may be applied to cement adjacent layers or edges of materials together, and to permit the forms to be readily handled, without danger of breaking them during the fabricating of the tanks. I have, for example, found that very satisfactory forms for small and medium sized tanks can be made by the combination of one or more layers or sheets of paper pulp reinforced with or covered with plaster of Paris or other material which penetrates the paper and which, when solidified, reinforces the paper. Various forms of cement can be substituted for plaster of Paris. It is also possible to make breakable building forms of plaster of Paris only, or of other cements without the use of paper, or of paper only. The breakable building forms should, of course, not be made of glass or similar material, which, when broken, would have sharp edged or pointed fragments which might cut or puncture the inner layer or surface of the tank or container and the hands of persons trying to remove the fragments from the tank or container.

It is, of course, desirable to make these breakable building forms as light as possible so that they can be more readily handled during the construction of the tanks about the forms. The thickness of the walls of the breakable forms should be such as to provide the necessary strength and support during fabrication of the container, but weak enough so that the building form can be broken when the container is completed, and removed in fragments through the hand holes or other openings in the container. These breakable building forms may be provided with any suitable braces or reinforcing members of such dimensions that they can easily be removed from hand holes or other openings in the finished containers.

These breakable building forms may be made in any suitable or desired manner. For example, these breakable forms may be made in molds of the correct form. In order to make these molds, an initial form may first be made of any suitable material having the shape of the interior of the finished tank or container to be constructed. This initial form may have any depressions or recesses formed on the outer surface thereof which are to be reproduced in the final breakable building forms. This initial form is then used for forming a mold in which the final breakable forms are to be made. This mold may be made of any suitable or desired material. For example, this mold may be made of clay which may be formed by molding the clay, while plastic, by pressing it against the initial form. This clay is then hardened or fired to produce the mold in which the final breakable forms are to be cast or otherwise formed. This mold may, of course, be formed in a number of sections or parts adapted to be secured together during the molding of the breakable forms and then separated to release the forms. The breakable forms may be made in these molds, either by pouring plastic material into the molds, by trowelling the same against the walls of the molds, or by laying the paper, wood pulp or other material against the interior surfaces of these molds and then applying plaster of Paris or other cement thereto. Preferably, the mold is so made than one wall of the breakable form is omitted therefrom, so that when the parts of the mold are in operative relation to one another, the mold is accessible through the open side thereof, and if the final breakable form requires that the open side thereof be closed, a wall for such open side can then be applied to the other walls of the breakable form by means of plaster, adhesive or in other ways. After the breakable building forms are removed from the molds, any irregularities or defects can be readily corrected and, if desired, the exterior surfaces of the forms may be painted or coated with additional plaster or other material. They are preferably also dusted or coated with a composition to which materials used during the manufacture of the containers will not become permanently attached. Any other manner of constructing the breakable forms may, of course, be provided, if desired.

These breakable forms may be made of hollow substantially unitary or one-piece structure, as shown in Fig. 9, or they may be made in sections or parts which may be secured together. The sectional forms may be employed whenever it is more convenient to use the same because of the size or shape of the container, and in cases where baffles or partitions are required in the tank to prevent surging or rapid flow of liquid from one end of the tank to the other. In Figs. 1 to 3, and 5 to 7, I have illustrated a breakable form for use in connection with a tank having two transverse baffles or partitions built into the same. Consequently, the breakable form as shown in these figures is divided transversely into three separable sections or parts 10, 11 and 12. The parts or sections 10 and 12 are open at one end only and the part 11 is open at both ends and the open ends of these parts are secured together so as to produce a substantially closed breakable form, about which the layers of material of the tank or container may be placed. Each of the three parts or sections of the breakable form is provided with a hand hole 14 in the upper wall thereof and any number of additional holes or depressions required for placing fittings on the tank may be provided. For example, the middle section 11 is provided with a hole 15 which may be employed to locate a fitting for accommodating a gage. The part 12 of the tank is provided with a hole 16 for accommodating an inlet fitting through which the tank will be filled with liquid. The parts or sections 10 and 12 of the tank are provided with small holes 17 into which vent fittings may extend. These holes for accommodating the fittings may be accurately located on the breakable forms so that the forms may be used for correctly locating the various fittings on the tank, or if desired, these openings may be larger than actually required and positioned approximately in the correct positions of the fittings in case the fittings of the tank are to be located by means other than the breakable forms.

Figure 2:
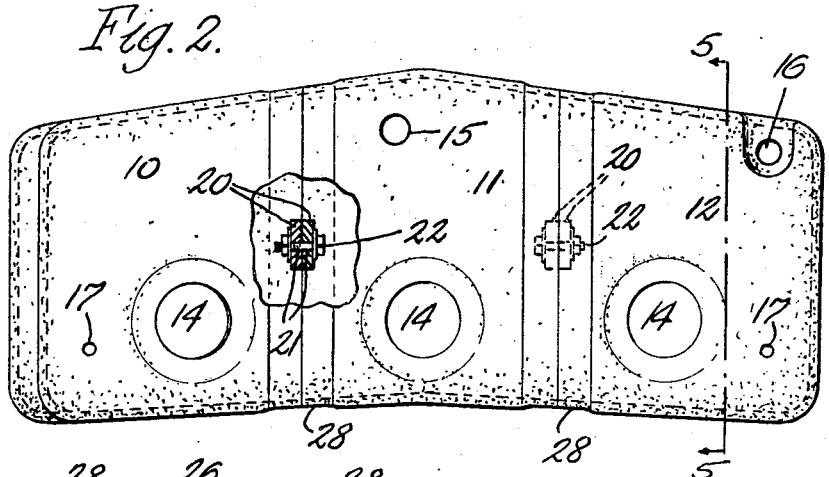
Fig. 2 is a top plan view thereof, partly in section.

The sections or parts of the breakable form may be secured together in any suitable or desired manner, and suitable attaching members may be secured to the parts of the forms to facilitate the correct assembly of the parts. In the construction illustrated, each section or part of the breakable form is provided at its open end or ends with transversely extending bars or strips 20, which may be provided with accurately positioned holes 21 for bolts 22 or other securing means. These bars may, for example, be of wood and may be nailed or otherwise secured to the sections or parts of the forms at the open ends thereof in such a manner that when the holes 21 in two adjacent strips are in registration so that bolts may be passed through the holes as shown in Figs. 1 and 2, the sections of the breakable form will be accurately located relatively to each other. These strips or attaching members also serve as braces to reinforce the open end portions of the sections. Any other means for securing together the sections of the forms may be employed.

While the breakable forms are constructed in sections mainly for the purpose of permitting baffles or partitions to be built into the tanks, yet it is also possible to construct the building forms in sections in cases where no baffles are required, as may, for example, be desirable when the tanks are of such irregular shape that the making of the breakable forms may be more readily done by building them in sections. When the parts or sections of the breakable forms are secured together, as shown in Figs. 1 and 2, the building of the tanks about the forms may be started.

Figure 3:
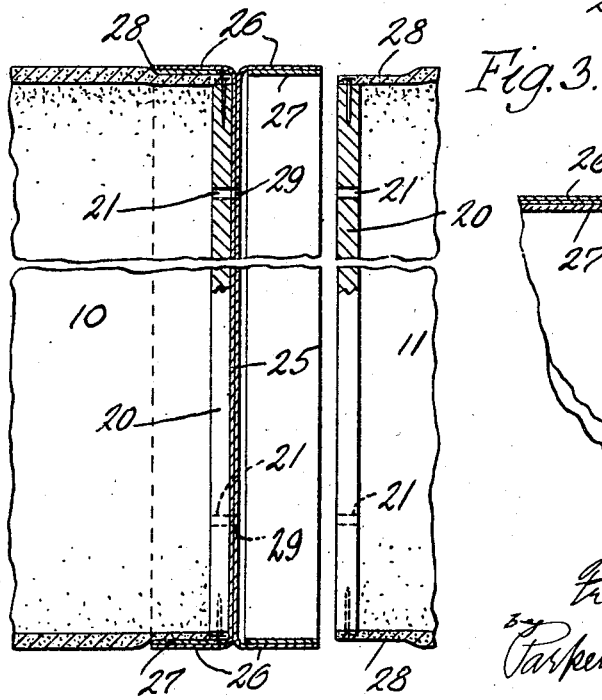
Fig. 3 is a fragmentary sectional elevation thereof, on an enlarged scale, showing portions of two adjacent sections about to be secured together with a baffle or partition spaced between them.
Figure 4:
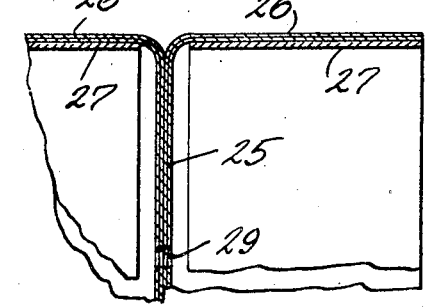
Fig. 4 is a fragmentary section, on a still larger scale, of an edge portion of a baffle.

When it is desired to construct the tanks with baffles or partitions therein, the bolts 22 connecting the adjacent forms are removed and a baffle is then inserted between adjacent parts or sections of a form, as indicated in Fig. 3. These baffles may be of any suitable or desired construction, those shown being formed of a number of plies of suitable material which form the transverse wall 25 of the baffle or partition. The edges of the baffles or partitions should extend to the outer surfaces of the breakable forms, and the edges of the baffles may be folded over as indicated at 26 to form one or more flanges. If desired, these flanges may be reinforced by strips 27 of fiber or other stiffening material. If the baffles or partitions are used in tanks which contain gasoline, oil, or the like, the portions of the baffles which are exposed to the contents of the tank must, of course, be made of material which is inert with reference to the liquid to be contained in the tank.

The baffles are so constructed that the flanges 26 thereof fit about the outer surfaces of the breakable forms, and if desired, these forms may have their outer edge portions recessed as indicated at 28, so that the outer surfaces of these flanges 26 may lie substantially flush with the outer surfaces of the breakable forms. The baffles are also provided with holes 29 therein which are so located that when the baffles are in correct positions with reference to the parts or sections of the forms, the holes 29 will be in registration with the holes 21 of the strips or bars 20, so that the bolts 22 may be placed through these registering holes for securing together the sections of the tank and simultaneously holding the baffles in place. In case the holes 29 in the partitions or baffles are objectionable, patches can readily be cemented over these holes when the tanks are completed.

The baffles may, of course, be provided with any other apertures or fittings. For example, as shown in Figs. 5 and 6, the baffles may be provided with one-way or flap valves 30 which control the passage of gas from one compartment of a tank to another. The baffles may also be provided with apertures for receiving a substantially horizontal inlet or filling tube 31 of suitable form which may be inserted into the tank during the construction of the same. Similarly a vent pipe or other devices may extend through the partitions or baffles to equalize the air pressure in the various compartments of the tank.

After the baffles have been positioned in a breakable form, the construction of the tank or container may be started. The inner layer of material of the tank is first applied to the exterior of the breakable form in any suitable manner. This layer may, for example, be in the form of a fabric impregnated or coated with a synthetic rubber or similar material which is inert with reference to and impermeable by gasoline, oil, or other liquid to be contained in the tank. This fabric may be cut into suitable pieces which may be applied to different sides of the breakable form, and the adjacent edges of the pieces may be cemented together to form a complete inner layer of lining of the container. The fittings to be installed on the container are also secured to the inner layer by cementing or otherwise. For example, in Fig. 7, a fitting or flange 35 for a hand hole is secured to the inner layer of material in any suitable manner, for example, by means of annular strips or pieces of material 36 which may be cemented to the inner layer of material and to the fitting 35. In Fig. 8, another outlet fitting 38 is shown, and in this case, the inner layer of material and the flange 40 of the fitting 38 are connected by means of an annular piece or strip 39. As shown in Fig. 7, the fitting 35 is centered with reference to the hole or aperture 14 in the wall 42 of the breakable building form. It will, of course, be understood that the outer surface of the breakable building form may be coated with soapstone, talc or any other material for preventing any of the layers of the tank or the cement employed for seaming together different portions of the tank, from adhering securely to the breakable building form.

It is also possible to form the inner layer of the tank by dipping the breakable building form into a suitable solution which upon evaporation of its solvent forms a film or sheet of material upon the outer surface of the form and which may constitute a layer of the container. If a dipping process is employed, it will of course, be obvious that the openings through the fittings must all be closed to prevent the liquid into which the form is dipped from flowing into the interior of the collapsible building form, and temporary closures, such as wooden plugs or other closure devices may be employed for this purpose.

Obviously, of course, this inner layer of material of the tank may also be applied to the outer surface of the breakable form by spraying, painting, or otherwise applying the solution to the form, and if necessary, a number of successive applications of the solution may be made by repeating the operations of dipping, spraying, painting or the like, until the inner layer of the container is built up to the desired thickness.

If the inner layer of material is applied to the breakable form as a sheet or plurality of sheets to be cemented together, it is possible to place on such a sheet the various fittings before the sheet is applied to the building form. This may, for example, be done by cutting the sheet of material with suitable correctly positioned apertures with reference to which the various fittings may be located and the sheet with the fittings applied thereto may then be placed on the breakable form. The fittings will then all be in their correct positions independently of the apertures or holes in the form, but the holes or other indicia on the breakable form may be used for correctly positioning the sheet with fittings on the form. When the tank is built in this manner, the form may be used without apertures or merely with depressions therein to receive the inwardly projecting portions of the fittings.

If the tank which is being built has partitions or baffles therein, then the first or inner layer of material of the tank or container is cemented or otherwise secured to the outer edges or flanges 26 of the baffles, so that baffles will be securely held in their correct positions relatively to the tank.

If the inner layer of material of the tank is of a type which protects other layers of the tank from attack by the liquid to be contained in the tank, then the inner layer of the tank is preferably tested for leaks before the other layers are applied thereto. By the use of my improved building forms, such tests can be readily made by plugging or closing all of the holes or openings in the fittings and then testing this inner layer of the tank for leaks while on the breakable building form. This may, for example, be done by applying air pressure to the interior of the inner layer of material and then submerging in water the partly constructed tank on its breakable form, similarly to the method now commonly used for testing inner tubes of tires for air leaks.

After the inner layer of material of the tank or container has been tested, the remaining layers of material may be applied to the tank in any suitable or desired manner, either one layer at a time or by first securing a number of layers together and then applying a group of layers to the layers already placed on the breakable form. These various layers are cemented together in any suitable or well known manner so as to form a substantially unitary wall for the tank or container.

When the tank has been completely built on the form, the form is broken in any suitable manner. Since the walls of the tank are flexible, the form can be broken by striking the wall of the tank by means of a mallet or other blunt instrument or by merely applying pressure to a wall of the tank to break a portion of the building form. Different parts of the tank may be struck or pressed in this manner to break various parts of the form, and it is then possible to reach into the hand holes 14 to remove fragments of the form through the hand holes. It is also possible by hand to further break the larger fragments of the form, this being particularly the case if the form is made of paper reinforced with one or more relatively thin layers of plaster of Paris. If the paper or other material is not readily broken in this manner, it may be possible to soften the same by water or other liquid before breaking the building form. If the tank or container has baffles or partitions therein, it is also necessary for the operator to reach into the hand holes 14 and remove the bolts 22 which secure the bracing and attaching members 20 of adjacent sections so that these members can be removed through the hand holes 14. Any fine particles or pieces of material of the breakable forms which cannot be removed by hand from the tank or container may be removed by any suitable suction or vacuum duct which may be passed into the interior of the tank through the hand holes 14.

If desired, the interior of the tank may then be coated with any suitable composition which is inert to the action of the liquid to be contained in the tank, and this coating will also prevent any small particles of dust which may remain within the tank from contaminating the liquid which is to be stored in the tank.

The breakable building form 40 illustrated in Fig. 9 is of unitary construction and may be made in the same manner as the sections of the form illustrated in the preceding figures. One of the walls of the form may be secured to the other walls after completion of the form in the mold by securing the same to the other walls by means of plaster, cement or the like. This type of form may also be made in two halves secured together in this manner. This form has a hand hole 41 in the upper wall thereof which is in registration with the corresponding hand hole in the tank or container, and when this tank or container is completed, the building form is broken and the parts thereof are then removed through the hand hole of the container, as described in connection with the sectional form.

Building forms of the type described have the advantage that they are inexpensive to produce and after a tank or container is completed, the fragments of the broken form can readily and quickly be removed from the container. The cost of the molds in which the building forms are made is also comparatively low so that if changes in the design of the tanks are made, new molds for producing breakable forms of different shapes and sizes can be made quickly and without great expense. My improved building forms also facilitate the accurate placing of fittings, baffles and the like on the containers.

I claim as my invention:

1. In a destructible hollow form which in outside shape and size conforms to the space within a hollow article which is to be made on said form, a wall composed of molded frangible plaster material reinforced and strengthened with paper bonded to the inside of the molded frangible plaster material of the wall.

2. A breakable form about which containers having flexible side walls and interior baffles may be constructed, said form being hollow and having relatively thin walls adapted to be readily broken when a container is completed, and being constructed in sections adapted to be secured together; a baffle arranged between two adjacent sections and having flanges extending to the exterior surfaces of said breakable form into positions to be secured to the walls of a container to be constructed about said form, and releasable means for securing said sections in correct operative relation to each other.

3. A breakable form according to claim 2, in which said sections are provided with recesses in the outer surfaces thereof adjoining the edge portions thereof into which the flanges of said baffles fit, for correctly positioning said flanges and said baffles on said form and to form smooth exterior surfaces on said form.

4. A breakable form about which containers having flexible side walls may be constructed, said form being hollow and having relatively thin walls adapted to be readily broken when a container is completed, and being constructed in sections adapted to be secured together, each section having an open side facing the open side of an adjacent section, and bracing and attaching members secured to adjacent sections of said form and extending crosswise of said open sides and having registering portions by means of which adjacent members may be secured together for correctly positioning adjacent sections relatively to each other, said walls of said sections of said forms having openings therein other than those defining said open sides, through which said bracing members may be secured together and through which said members may be removed when said container is completed.

5. A breakable form according to claim 4, in which the bracing and attaching members have apertures therein, the apertures of one attaching member being in registration with the apertures of an attaching member of an adjacent section when said sections are in correct positions relatively to each other, and releasable securing members adapted to extend through said apertures for securing the attaching members of adjacent sections in fixed relation to each other.

FRANCIS W. BLANCHARD.

REFERENCES CITED

The following references are of record in the file of this patent:

UNITED STATES PATENTS

| Number | Name | Date |
|---|---|---|
| 415,251 | Meyer | Nov. 19, 1889 |
| 791,774 | Gregory | June 6, 1905 |
| 1,002,119 | Bennett et al. | Aug. 29, 1911 |
| 1,509,346 | Dykes | Sept. 23, 1924 |
| 2,217,734 | Dreyfus | Oct. 15, 1940 |
| 2,343,292 | Greneker | Mar. 7, 1944 |
| 2,360,899 | Scharenberg | Oct. 24, 1944 |
| 2,364,710 | Greneker | Dec. 12, 1944 |
| 2,369,892 | Greneker | Feb. 20, 1945 |
| 2,374,420 | Cline | Apr. 24, 1945 |